(12) United States Patent
Delurgio et al.

(10) Patent No.: US 7,386,519 B1
(45) Date of Patent: Jun. 10, 2008

(54) INTELLIGENT CLUSTERING SYSTEM

(75) Inventors: Phil Delurgio, Dana Point, CA (US); Krishna Venkatraman, Menlo Park, CA (US); Suzanne Valentine, Atlanta, GA (US)

(73) Assignee: Demandtec, Inc., San Carlos, CA (US)

( * ) Notice: Subject to any disclaimer, the term of this patent is extended or adjusted under 35 U.S.C. 154(b) by 0 days.

(21) Appl. No.: 10/092,361

(22) Filed: Mar. 5, 2002

Related U.S. Application Data (63) Continuation-in-part of application No. 10/007,002, filed on Nov. 30, 2001.

(51) Int. Cl.
G06F 17/00 (2006.01)
G06F 17/30 (2006.01)

(52) U.S. Cl. .................................. 705/400; 705/10

(58) Field of Classification Search ............. 705/1, 705/7, 10, 400, 26, 29, 30, 36 R, 8, 28, 35, 705/22; 703/2, 6, 23
See application file for complete search history.

(56) References Cited

U.S. PATENT DOCUMENTS

| | | | |
|---|---|---|---|
| 3,017,610 A | 1/1962 | Auerbach et al. | |
| 4,744,026 A | 5/1988 | Vanderbei | |
| 4,862,357 A | 8/1989 | Ahlstrom et al. | |
| 4,907,170 A | 3/1990 | Bhattacharya | |
| 4,916,443 A | 4/1990 | Barrett et al. | |
| 5,063,506 A | 11/1991 | Brockwell et al. | 364/402 |
| 5,117,354 A | 5/1992 | Long et al. | 364/401 |
| 5,189,606 A | 2/1993 | Burns et al. | |
| 5,212,791 A | 5/1993 | Damian et al. | |
| 5,249,120 A | 9/1993 | Foley | 364/401 |
| 5,299,115 A | 3/1994 | Fields et al. | 364/401 |
| 5,377,095 A | 12/1994 | Maeda et al. | 364/401 |
| 5,459,656 A | 10/1995 | Fields et al. | 364/401 |
| 5,521,813 A | 5/1996 | Fox et al. | |
| 5,615,109 A | 3/1997 | Eder | |
| 5,694,551 A | 12/1997 | Doyle et al. | |
| 5,712,985 A | 1/1998 | Lee et al. | 395/207 |
| 5,732,401 A | 3/1998 | Conway | 705/29 |
| 5,765,143 A | 6/1998 | Sheldon et al. | 705/28 |
| 5,790,643 A | 8/1998 | Gordon et al. | 379/119 |
| 5,799,286 A | 8/1998 | Morgan et al. | 705/30 |
| 5,822,736 A | 10/1998 | Hartman et al. | 705/1 |

(Continued)

FOREIGN PATENT DOCUMENTS

WO    WO 97/46950    12/1997

(Continued)

OTHER PUBLICATIONS

Yeoman: "The Optimal Offering Price for Underwritten Seurities"; 1993, vol. 55/01-A of the Dissertation Abstracts international, p. 4743, (Abstract Only).*

(Continued)

*Primary Examiner*—Igor N. Borissov
(74) *Attorney, Agent, or Firm*—Kang Lim (57) ABSTRACT

A method for forming a plurality of stores into a plurality of clusters is provided. Store specific information is collected. Optimized combinations for each individual store are provided based on the store specific information. Clusters are created based on the closeness of the optimal combinations.

20 Claims, 8 Drawing Sheets

U.S. PATENT DOCUMENTS

| | | | |
|---|---|---|---|
| 5,832,456 A | 11/1998 | Fox et al. | |
| 5,832,458 A | 11/1998 | Jones | |
| 5,873,069 A | 2/1999 | Reuhl et al. | 705/20 |
| 5,878,400 A | 3/1999 | Carter, III | 705/20 |
| 5,902,351 A | 5/1999 | Streit et al. | |
| 5,918,209 A | 6/1999 | Campbell et al. | 705/5 |
| 5,933,813 A | 8/1999 | Teicher et al. | 705/26 |
| 5,987,425 A | 11/1999 | Hartman et al. | 705/20 |
| 6,009,407 A | 12/1999 | Garg | 705/10 |
| 6,009,415 A | 12/1999 | Shurling et al. | |
| 6,029,139 A | 2/2000 | Cunningham et al. | 705/10 |
| 6,032,123 A | 2/2000 | Jameson | 705/8 |
| 6,032,125 A | 2/2000 | Ando | 705/10 |
| 6,044,357 A | 3/2000 | Garg | |
| 6,052,686 A * | 4/2000 | Fernandez et al. | 707/100 |
| 6,078,893 A | 6/2000 | Ouimet et al. | 705/10 |
| 6,094,641 A | 7/2000 | Ouimet et al. | 705/10 |
| 6,125,355 A | 9/2000 | Bekaert et al. | 705/36 |
| 6,134,534 A | 10/2000 | Walker et al. | 705/26 |
| 6,173,345 B1 * | 1/2001 | Stevens | 710/100 |
| 6,202,070 B1 | 3/2001 | Nguyen et al. | |
| 6,205,431 B1 | 3/2001 | Willemain et al. | 705/10 |
| 6,219,649 B1 * | 4/2001 | Jameson | 705/8 |
| 6,308,162 B1 | 10/2001 | Ouimet et al. | 364/401 |
| 6,321,207 B1 | 11/2001 | Ye | |
| 6,341,268 B2 | 1/2002 | Walker et al. | 705/15 |
| 6,341,269 B1 | 1/2002 | Dulaney et al. | 705/22 |
| 6,397,193 B1 | 5/2002 | Walker et al. | 705/16 |
| 6,405,175 B1 | 6/2002 | Ng | |
| 6,456,986 B1 | 9/2002 | Boardman et al. | 705/400 |
| 6,536,935 B2 | 3/2003 | Parunak et al. | |
| 6,546,387 B1 | 4/2003 | Triggs | |
| 6,553,352 B2 * | 4/2003 | Delurgio et al. | 705/400 |
| 6,567,824 B2 | 5/2003 | Fox | |
| 6,609,101 B1 | 8/2003 | Landvater | |
| 6,684,193 B1 | 1/2004 | Chavez et al. | |
| 6,697,824 B1 | 2/2004 | Bowman-Amuah | |
| 6,725,208 B1 | 4/2004 | Hartman et al. | |
| 6,731,998 B2 | 5/2004 | Walser et al. | |
| 6,735,572 B2 | 5/2004 | Landesmann | |
| 6,745,184 B1 * | 6/2004 | Choi et al. | 707/6 |
| 6,826,538 B1 | 11/2004 | Kalyan et al. | |
| 6,910,017 B1 * | 6/2005 | Woo et al. | 705/10 |
| 6,934,931 B2 | 8/2005 | Plumer et al. | |
| 6,965,867 B1 | 11/2005 | Jameson | |
| 6,988,076 B2 | 1/2006 | Ouimet | |
| 7,058,617 B1 | 6/2006 | Hartman et al. | |
| 7,072,848 B2 | 7/2006 | Boyd et al. | |
| 7,092,896 B2 * | 8/2006 | Delurgio et al. | 705/10 |
| 7,092,918 B1 * | 8/2006 | Delurgio et al. | 705/400 |
| 7,130,811 B1 * | 10/2006 | Delurgio et al. | 705/10 |
| 7,240,019 B2 | 7/2007 | Delurgio et al. | |
| 7,249,031 B2 | 7/2007 | Close et al. | |
| 7,249,032 B1 | 7/2007 | Close et al. | |
| 7,249,033 B1 | 7/2007 | Close et al. | |
| 2001/0014868 A1 | 8/2001 | Herz et al. | |
| 2002/0023001 A1 | 2/2002 | McFarlin et al. | |
| 2002/0042739 A1 | 4/2002 | Srinivasan et al. | |
| 2002/0042755 A1 | 4/2002 | Kumar et al. | |
| 2002/0107819 A1 * | 8/2002 | Ouimet | 705/400 |
| 2002/0116348 A1 | 8/2002 | Phillips et al. | |
| 2002/0123930 A1 | 9/2002 | Boyd et al. | |
| 2002/0165834 A1 * | 11/2002 | Delurgio et al. | 705/400 |
| 2002/0169657 A1 | 11/2002 | Singh et al. | |
| 2002/0198794 A1 * | 12/2002 | Williams et al. | 705/28 |
| 2003/0110072 A1 * | 6/2003 | Delurgio et al. | 705/10 |
| 2003/0177103 A1 | 9/2003 | Ivanov et al. | |
| 2004/0111358 A1 * | 6/2004 | Lange et al. | 705/37 |
| 2004/0243432 A1 * | 12/2004 | Kelly et al. | 705/1 |
| 2005/0108070 A1 * | 5/2005 | Kelly et al. | 705/5 |
| 2006/0161504 A1 * | 7/2006 | Walser et al. | 705/400 |
| 2006/0195345 A1 * | 8/2006 | Close et al. | 705/7 |
| 2006/0224534 A1 | 10/2006 | Hartman et al. | |

FOREIGN PATENT DOCUMENTS

| | | |
|---|---|---|
| WO | WO 98/53415 | 11/1998 |
| WO | WO 00/70519 | 11/2000 |
| WO | WO 00/70556 | 11/2000 |

OTHER PUBLICATIONS

"Gymboree Enhances Price Management," Retail Systems Alert, vol. 13, No. 6, Jun. 2000.*

Binkley, James K.; Connor, John M., "Grocery market pricing and the new competitive environment." Journal of Retailing, v74, n2, p273, Summer 1998.*

Scherage, Dan, "You do the math," Chain Store Age, v76n7, pp. 52-54, Jul. 2000.*

Mulhern et al. Measuring Market Response to Price Changes; A Calssification Approach; J Busn Res 1995:33:197-205.*

"Report of Novelty Search" by Patentec, dated Feb. 9, 2001.

"Report of Novelty Search" by Patentec, dated Jul. 25, 2001.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", University of Pennsylvania, Working Paper 98-009, pp. 1-48.

Alan Mercer, "Non-linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28.

Robert C. Blattberg et al., "How Promotiions Work", Marketing Science, vol. 14, No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Eileen Bridges et al., "A High-Tech Product Market Share Model With Customer Expectations" Marketing Science, vol. 14, No. 1, Winter 1995, pp. 61-81.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 5-11.

Fusun Gonul, "Modeling Multiple Sources of Heterogeneity in Multinomial Logit Models: Methodological and Managerial Issues", Marketing Science, vol. 12, No. 3, Summer 19932, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does it Matter How price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment-level Model of Category Volume and Brand Choice", Marketing Science, vol. 15, No. 1, 1996, pp. 38-59.
Stephen J. Hoch et al., "Determinants of Store-Level Price Elasticity", Journal of Marketing Research, vol. XXXII (Feb. 1995), pp. 17-29.
Magid M. Abraham et al., "An Implemented System for Improving Promotion Productivity Using Store Scanner Data", Marketing Science, vol. 12, No. 3, Summer 1993.
Peter S. Fader et al., "Modeling Consumer Choice among SKUs", Journal of marketing Research, vol. XXXII (Nov. 1996), pp. 442-452.
Rossi, Delorgio, & Kantor; "Making Sense of Scanner Data;" Harvard Business Review, Reprint F00205.
Bucklin & Gupta, "Brand Choice, Purchase Incidence, and Segmentation: An Integrated Modeling Approach," Journal of Marketing Research, May 1992, pp. 201-215, vol. XXIX.
Smith, Mathur, & Kohn; Bayesian Semiparametric Regression: An Exposition and Application to Print Advertising;: Jan. 3, 1997; Australian Graduate School of Management, University of New South Wales, Sydnet 2025, Australia.
Blattberg and Deighton, "Manage Marketing by the Customer Equity," Harvard Business Review, Jul.-Aug. 1996, pp. 136-144.
Christen, Gupta, Porter, Staelin & Wittink; "Using Market-Level Data to Understand the Effectiveness of Promotional Activities;" Dec. 22, 1995.
Ross Link, "Are Aggregate Scanner Data Models Biased?," Journal of Advertising Research, Sep./Oct. 1995, pp. RC8-RC12, ARF.
Russell et al., "Understanding Brand Completion Using Micro and Macro Scanner Data," Journal of Marketing Research, vol. XXXI (May 1994), pp. 289-303.
John Philip Jones, "The Double Jeopardy of Sales Promotions," Harvard Business Review, Sep.-Oct. 1999, pp. 145-152.
Buzzell, Quelch, & Salmon; "The Costly Bargain of Trade Promotion;" Harvard Business Review, Reprint 90201, Mar.-Apr. 1990, pp. 1-9.
Curry, Divakar, Mathur & Whiteman; "Bvar as a Category Management Tool: An Illustration and Comparison with Alternative Techniques;" Journal of Forecasting, vol. 14, Iss. No. 3, (1995), pp. 181-199.
Montgomery: "The Impact of Micro-Marketing on Pricing Strategies", 1994 The University of Chicago vol. 55/12-A of Dissertation of Abstracts International, p. 3922 (Abstract Only).
Busch: "Cost Modeling as a Technical Management Tool", Research-Technology Management, Nov./Dec. 1994, vol. 37, No. 6, pp. 50-56.
"Pacificorp IRP: Renewables Costs Must Drop 65% to be Competitive with Gas".
"PCT International Search Report", Application No. PCT/US02/14977, mailed May 5, 2003.
Dyer, Robert F. et al., "Case Studies in Marketing Decisions Using Expert Choice," Decision Support Software, 1988, pp. 2, 5-7.
"PCT International Search Report", Application No. PCT/US03/30488, mailed Jan. 28, 2004.
Robert J. Dolan, "How Do You Know When the Price is Right?", Harvard Business Review, Sep.-Oct. 1995, p. 4-11.
Alan L. Montgomery and Peter R. Rossi, "Estimating Price Elasticities with Theory-Based Priors," Journal of Marketing Research vol. XXXVI, Nov. 1999 (pp. 413-423).
Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).
Alan L. Montgomery, "Creating Micro-Marketing Pricing Strategies Using Supermarket Scanner Data," Marketing Science, vol. 16, No. 4, 1997 (pp. 315-337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).
Arnold Zellner, "On Assessing Prior Distribution sand Bayesian Regression Analysis With G-Prior Distributions," Elsevier Science Publishers, 1986 (pp. 233-243).

D. V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.
"KhiMetrics Helps Retailers Increase Margins With Two New Tools for Their Retail Revenue Management Application Suite." PR Newswire, Mar. 1, 2001.
"KhiMetrics and Retek Form Marketing Alliance for Comprehensive Retail Pricing Solution." PR Newswire, Feb. 19, 2001.
Barth, Brad, "ShopKo Holds the Price Line." Daily News Record, p. 10, Oct. 4, 2000.
Barth, Brad, "Shopko Tests Automated Markdowns", WWD Oct. 4, 2000, pp. 1-3.
"Manugistics Agrees to Acquire Talus Solutions." PR Newswire, Sep. 21, 2000.
"Goodyear Implements Trilogy's MultiChannel Pricing Solution as Its Enterprise-Wide E-Pricer Platform." Business Wire, p. 2286, Jun. 27, 2000.
"IMRglobal Signs New Product Implementation Agreement with Retek to Improve Retail Pricing and Markdown Process." Business Wire, p. 1590, Jun. 7, 2000.
Cook, Martie, "Optimizing Space and Sales with Markdown Software", Office.com, May 31, 2000, p. 1.
"New Tools for Modeling Elasticity, Optimizing Prices and Collecting Live Pricing from the Web to Debut at Retail Systems 2000 in Chicago." Business Wire, p. 1484, Apr. 18, 2000.
"Essentus and Spotlight Solutions Partnership Delivers Precise Markdown Decisions", Business Wire, Apr. 17, 2000, 3 pages.
Melcer, Rachel, "Local Tech Firm Creates Retail Markdown Tool", Business Courier online, Mar. 24, 2000, pp. 1-4.
Technology Strategy Incorporated, www.grossprofit.com, Mar. 2, 2000, pp. 1-20.
Kadiyali et al., "Manufacturer-retailer Channel Interactions and Implications for Channel Power: An Investigation of Pricing in Local Market", Marketing Science, Spring 2000, V. 19, Issue 2.
Andrew B. Gelman et al., "Bayesian Data Analysis", pp. 439-455, Chapman & Hall/CRC, First Edition 1995, Reprinted 2000.
Smith et al., "A Discrete Optimization Model for Seasonal Merchandise Planning." Journal of Retailing, vol. 74, No. 2, p. 193(29), Summer 1998.
Abraham, Magid M. and Leonard M. Lodish, "Promoter: An Automated Promotion Evaluation System," Marketing Science, vol. 6, No. 2, 1987 (p. 101-123).
Little, John D. C., "Brandaid: A Marketing-Mix Model, Part 1: Structure," Operations Research, vol. 23, No. 4, Jul.-Aug. 1975 (p. 628-655).
Cerf, Vinton G. and Robert E. Kahn, "A Protocol for Packet Network Interconnection," IEEE Transactions on Communications COM-22, May 1974, (p. 637-648).
Flanagan, David, "Javascript: The Definitive Guide, 3$^{rd}$ Edition," published by O'Reilly in Jun. 1998 (ISBN 1-56592-392-8) section 14.8.
Berners-Lee, T., "Hypertext Markup Language 2.0 Working Paper," Nov. 1995 (pp. 1-3).
Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).
Diebold, Francis X., "The Past, Present, and Future of Macroeconomic Forecasting" Economic Perspectives (IJEP), vol. 12, No. 2, pp. 175-192, Spring 1998.
"Supplementary European Search Report", Application No. 02719197.2-2221 dated Feb. 2, 2007, 3 pages.
Hillier, Frederick S., et al. "Introduction to Operations Research", McGraw-Hill, Inc., 1995, Sixth Edition, pp. 1-14.
Montgomery: "The Impact of Micro-Marketing on Pricing Strategies", 1994 The University of Chicago vol. 55/12-A of Dissertation of Abstracts International, p. 3922 (Abstract Only).
Busch: "Cost Modeling as a Technical Management Tool", Research-Technology Management, Nov./Dec. 1994, vol. 37, No. 6, pp. 50-56.

A.F.M. Smith, "A General Bayesian Linear Model," University of Oxford, Apr. 1972.

"Merriam Webster's Collegiate Dictionary", 10th edition, p. 585, Merriam-Webster Incorporated, 1999.

Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.

* cited by examiner

INTELLIGENT CLUSTERING SYSTEM

CROSS-REFERENCE TO RELATED APPLICATIONS

This application is a Continuation-in-Part to co-pending U.S. patent application Ser. No. 10/007,002 filed Nov. 30, 2001, entitled "RULE RELAXATION AND SUBSET OPTIMIZATION SYSTEM", by Michael Neal, Krishna Venkatraman, Rob Parkin, Suzanne Valentine, Phil Delurgio, and Hau Lee, which is incorporated by reference herein for all purposes.

BACKGROUND OF THE INVENTION

The present invention relates to providing a plurality of price clusters for a plurality of stores.

In businesses, prices of various products must be set. In a chain of a plurality of stores, instead of setting the prices in each store individually, the stores may be grouped in one or more clusters. Each cluster may form a price zone. The creation of price zones in the past may have been done only using geographical proximity to generate clusters.

SUMMARY OF THE INVENTION

To achieve the foregoing and other objects and in accordance with the purpose of the present invention, a method for forming a plurality of stores into a plurality of clusters is provided. An optimization is performed for the plurality of stores to obtain individual store prices. The individual store prices are used to create the plurality of clusters. An optimization for the plurality of clusters is performed to obtain cluster prices.

In another embodiment of the invention, a method for forming a plurality of stores into a plurality of clusters is provided. Store specific information is collected. Optimized combinations for each individual store are provided based on the store specific information. Clusters are created based on the closeness of the optimal combinations.

In another embodiment of the invention, an apparatus for forming a plurality of stores into a plurality of clusters is provided. Computer readable code for collecting store specific information is provided. Computer readable code for optimizing combinations for each individual store based on the store specific information is provided. Computer readable code for creating clusters based on the closeness of the optimal combinations is provided.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In examining purchase data, it is found that geographical price zones (clustering by geography alone) may reduce profits by as much as 60%.

Figure 10:
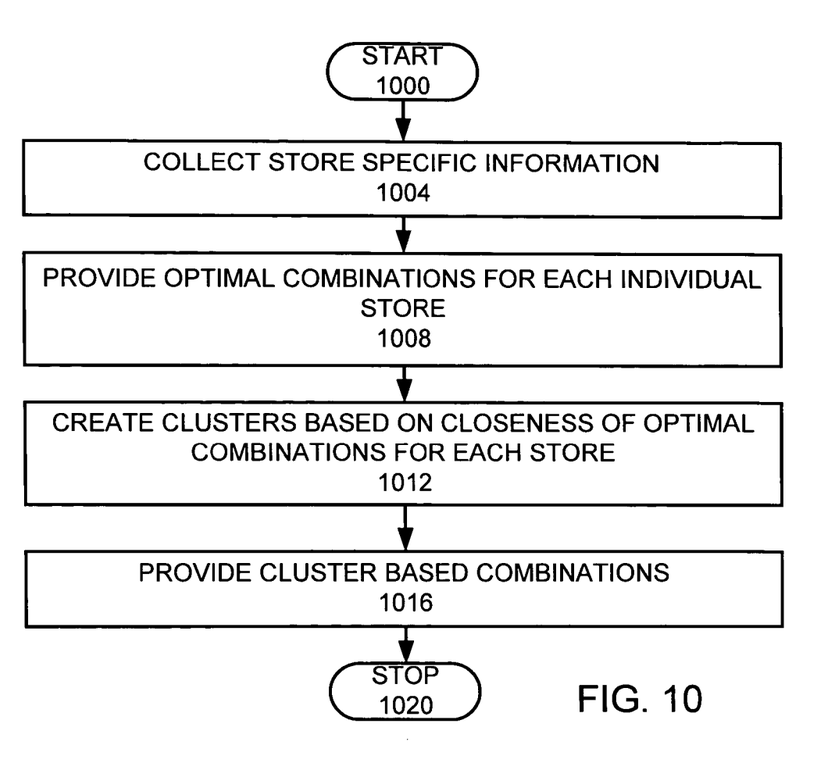
FIG. 10 is a generic flow chart of an embodiment of the invention.

To facilitate understanding, FIG. 10 is a broad flow chart of an embodiment of the invention. The steps of FIG. 10 start at step 1000 as shown. Store specific information is collected (step 1004). Such store specific information may be individual store point-of-sales data, cost data, or customer survey data. The store specific information is used and processed to provide optimal combinations fore each individual store (step 1008). In the specification and claims, the use of the word "optimal" may mean a value or combination or selection that is determined through the use of an algorithm as the best result found by the algorithm. Since optimization may be a complex process, the optimal result may not be the absolute best result but may be a localized best result. Clusters of stores are then formed based on the closeness of the optimal combinations for each store (step 1012). New cluster based combinations are then provided (step 1016). The steps of FIG. 10 stop at step 1020.

Figure 1:
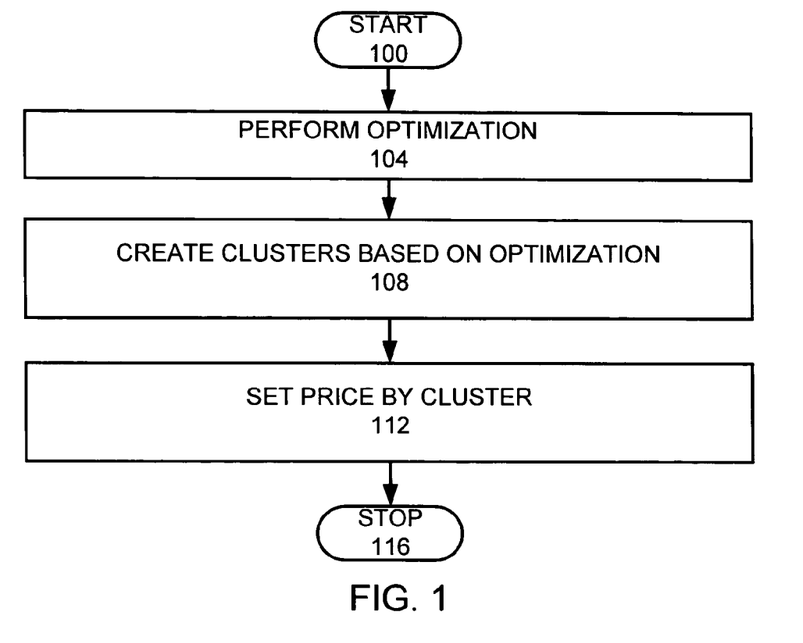
FIG. 1 is high level flow chart of how a clustering process might be used.
Figure 2:
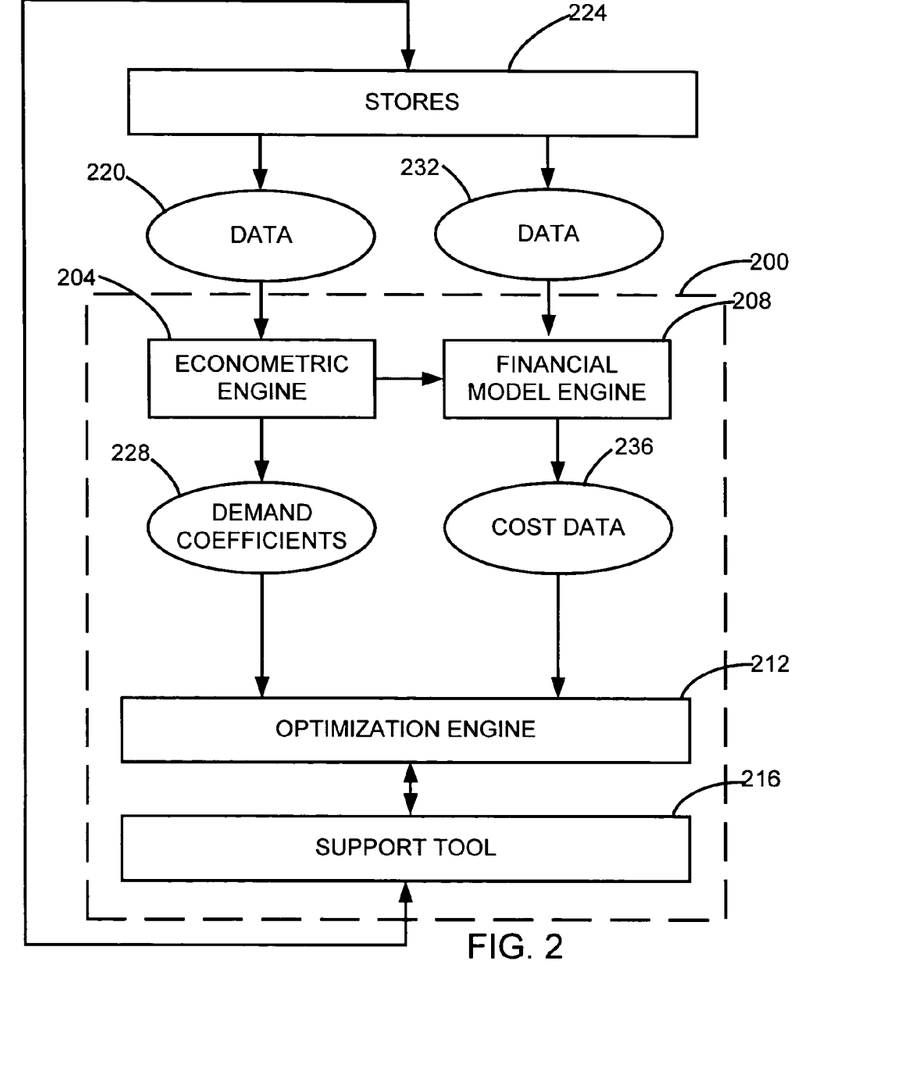
FIG. 2 is a high level schematic view of a price optimizing system.

To facilitate discussion, FIG. 1 is a flow chart of a process intelligently clustering stores, which is an example of an embodiment of the invention. In this example store specific point-of-sales and cost data has already been collected. The steps of FIG. 1 start at step 100 as shown. First, an optimization is performed using the point-of-sales and cost data (step 104). Preferably, the same optimization is performed for all stores. FIG. 2 is a schematic view of a price optimizing system 200, which may be used to provide a price optimization. The price optimizing system 200 comprises an econometric engine 204, a financial model engine 208, an optimization engine 212, and a support tool 216. The econometric engine 204 is connected to the optimization engine 212, so that the output of the econometric engine 204 is an input of the optimization engine 212. The financial model engine 208 is connected to the optimization engine 212, so that the output of the financial model engine 208 is an input of the optimization engine 212. The optimization engine 212 is connected to the support tool 216 so that output of the optimization engine 212 is provided as input to the support tool 216 and output from the support tool 216 may be provided as input to the optimization engine 212. The econometric engine 204 may also exchange data with the financial model engine 208.

Figure 3:
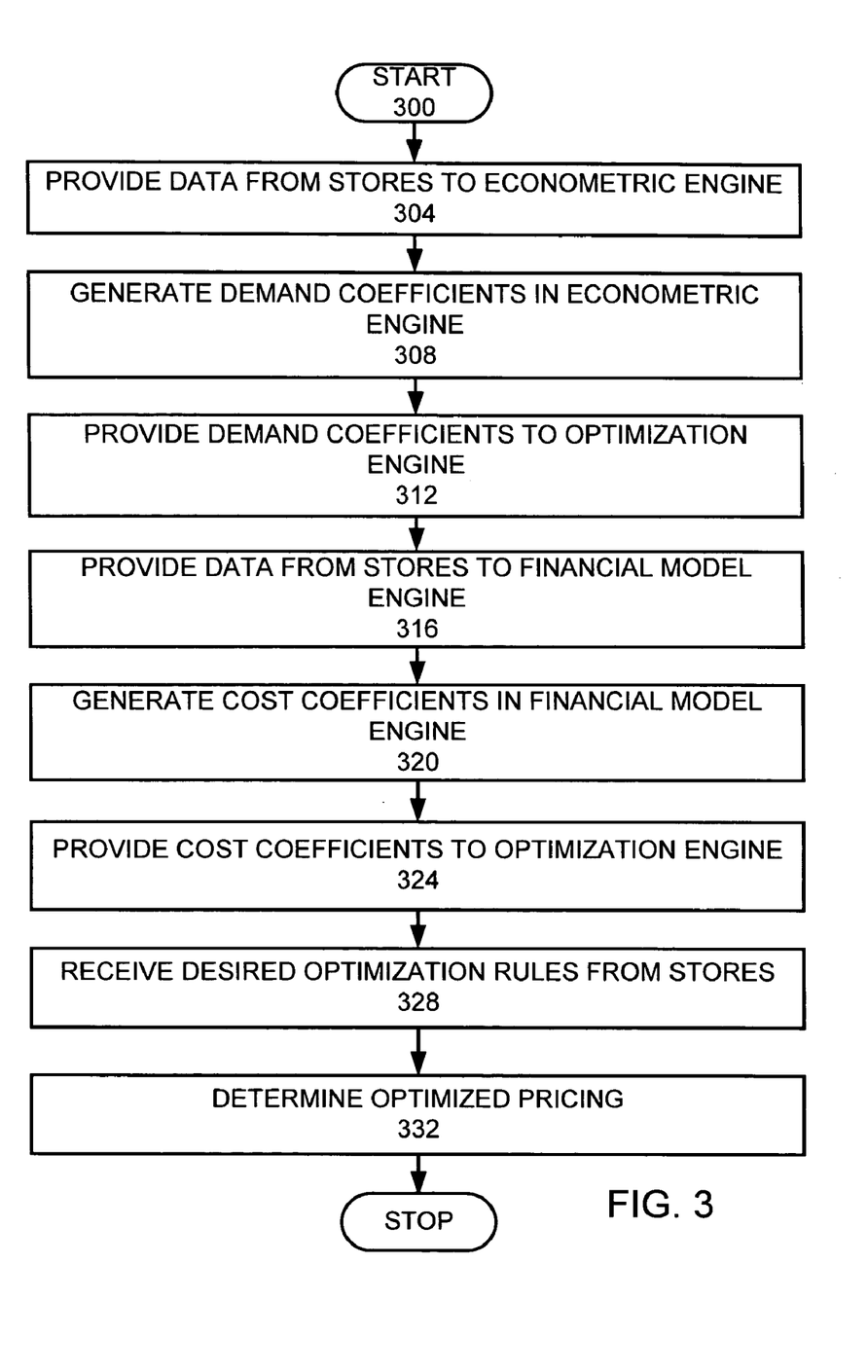
FIG. 3 is more detailed flow chart of an optimization process.

FIG. 3 is a more detailed flow chart of a preferred embodiment of a process that utilizes the price optimizing system 200 to optimize prices to perform an optimization (step 104). The steps of FIG. 3 start at step 300. Data 220 is provided from the store computer systems 224 to the econometric engine 204 (step 304). Generally, the data 220 provided to the econometric engine 204 may be point-of-sale information, product information, and store information. The econometric engine 204 processes the data 220 to provide demand coefficients 228 (step 308) for a set of algebraic equations that may be used to estimate demand (volume sold) given certain marketing conditions (i.e., a particular store in the chain), including a price point. The demand coefficients 228 are provided to the optimization engine 212 (step 312). Additional processed data from the econometric engine 204 may also be provided to the optimization engine 212.

The financial model engine 208 may receive data 232 from the store computer systems 224 (step 316) and processed data from the econometric engine 204. The data 232 received from the stores is generally cost-related data, such as average store labor rates, average distribution center labor rates, cost of capital, the average time it takes a cashier to scan an item (or unit) of product, or how long it takes to stock a received unit of product and fixed cost data. The financial model engine 208 may process the data to provide a variable cost and fixed cost for each unit of product in a store, generating cost coefficients (step 320). The processing by the econometric engine 204 and the processing by the financial model engine 208 may be done in parallel. Cost data 236 is provided from the financial model engine 208 to the optimization engine 212 (step 324).

The optimization engine 212 utilizes the demand coefficients 228 to create a demand equation. The optimization engine is able to forecast demand and cost for a set of prices and promotion conditions, such as store displays and ads to calculate net profit. The stores 224 may use the support tool 216 to provide optimization rules to the optimization engine 212 (step 328). The optimization engine 212 may use the demand equation, the variable and fixed costs, and the rules to compute an optimal set of prices that meets the rules (step 332). For example, if a rule specifies the maximization of profit, the optimization engine would find a set of prices that causes the largest difference between the total sales revenue and the total cost of all products being measured. In this preferred embodiment, the prices are provided on a store-by-store basis, instead of by groups of stores. In addition, in this example the prices are also provided on an item-by-item basis.

If a rule providing a promotion of one of the products by specifying a discounted price is provided, the optimization engine may provide a set of prices that allows for the promotion of the one product and the maximization of profit under that condition. The rules normally include an objective, such as optimizing profit or optimizing volume of sales of a product and constraints, such as a limit in the variation of prices.

When profit is maximized, it may be maximized for a sum of all measured products. Such a maximization may not maximize profit for each individual product, but may instead have an ultimate objective of maximizing total profit. The result of this optimization provides an optimal product and price combination for each store.

Figure 4:
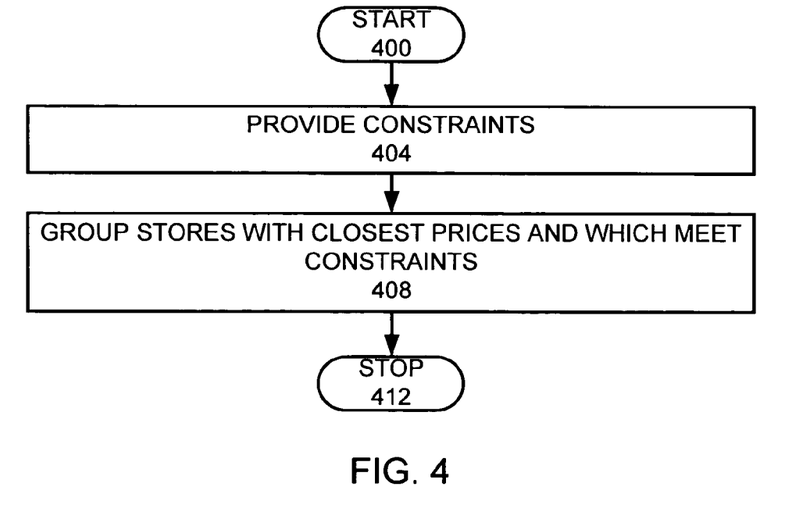
FIG. 4 is a more detailed flow chart of a clustering process.

FIG. 4 is a more detailed flow chart of a preferred embodiment of step 108 for creating clusters (groups) based on the closeness of the optimized product and price combinations for each store. The steps of FIG. 4 start at step 400 as shown. Constraints may be provided (step 404). Examples of such constraints are prohibiting certain stores from being within the same cluster, forcing certain stores to be in the same cluster, setting a maximum number of clusters, and setting a minimum cluster size. The forcing certain stores to be in the same cluster may be used to place geographically close stores in the same cluster or to place stores with similar traits, such as being in a downtown area or near a freeway exit, in the same cluster.

Stores with the closest prices and which meet the constraints are then grouped together in clusters (step 408). There may be many different approaches to clustering stores with the closest prices. Such clustering may attempt to minimize the sum of differences or distances in prices between stores in a cluster. The steps of FIG. 4 stop at step 412.

Figure 5:
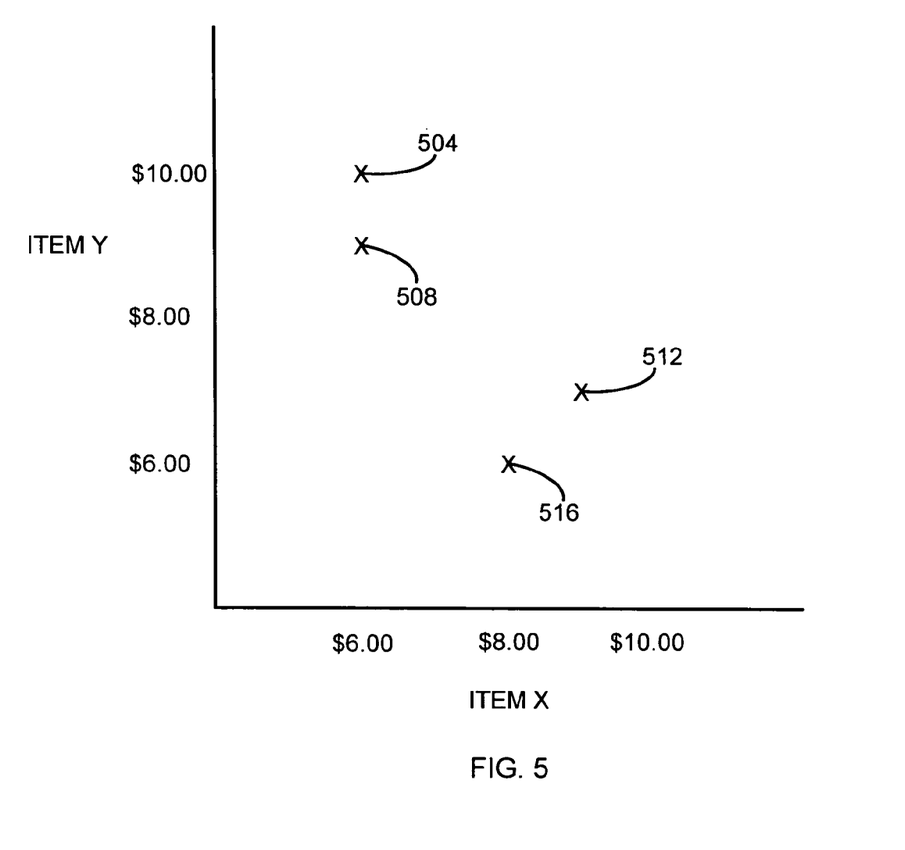
FIG. 5 is graph illustrating item prices by store.

FIG. 5 is a chart of an example of four stores, which are formed into two clusters, with each store carrying item X and item Y. Table 1 below provides a list of the prices for items X and Y per store.

TABLE 1

| STORE | ITEM X | ITEM Y |
|---|---|---|
| STORE 1 | $6.00 | $10.00 |
| STORE 2 | $6.00 | $9.00 |
| STORE 3 | $9.00 | $7.00 |
| STORE 4 | $8.00 | $6.00 |

The prices are plotted in FIG. 5 for store 1 (504), store 2 (508), store 3 (512), and store 4 (516) with the price of item X plotted along the horizontal axis and the price of item Y plotted along the vertical axis. A distance may be calculated by: Distance=$\sqrt{(Price_{s1,x}-Price_{s2,x})^2+(Price_{s1,y}-Price_{s2,y})^2}$, where s1 and s2 is one of the store pairs. This distance may be calculated between all possible store pair combinations. Table 2 illustrates the distances for all pairings.

TABLE 2

|  | DISTANCE |
|---|---|
| STORE 1 AND STORE 2 | 1 |
| STORE 1 AND STORE 3 | 4.24 |
| STORE 1 AND STORE 4 | 4.47 |
| STORE 2 AND STORE 3 | 3.61 |
| STORE 2 AND STORE 4 | 3.61 |
| STORE 3 AND STORE 4 | 1.41 |

Therefore, the total distances for each possible cluster pairings are shown in Table 3.

TABLE 3

| CLUSTER | TOTAL DISTANCE |
|---|---|
| 1 WITH 2 AND 3 WITH 4 | 2.41 |
| 1 WITH 3 AND 2 WITH 4 | 7.85 |
| 1 WITH 4 AND 2 WITH 3 | 8.08 |

The store pair combination with the lowest distance would be chosen as the best cluster pairing. From Table 3, it can be seen that by putting stores 1 and 2 in one cluster and stores 3 and 4 in another cluster, the total distances between stores within the same cluster are minimized, and therefore the stores are clustered accordingly.

These distances may be weighted according to volume sales by multiplying the distances by revenue.

Various algorithms may be used to actually form clusters. One example of such clustering is the k-means clustering method. The FASTCLUS procedure available in SAS, provided by the SAS Institute, Inc of Cary, N.C. is one procedure that may be used to create the clusters.

If a store does not sell a particular product, an average price for the product may be calculated and used as the price of the product for the store that does not sell the product, so that the absence of the product does not affect the clustering of the stores. If a constraint requires that two or more stores be placed in the same cluster, their prices may be averaged together and the average price may be used as individual store prices for these stores, so that the clustering algorithm automatically places these stores in the same cluster, since their prices are identical.

After the clusters are created (step 108), prices for items in the store are set by cluster so that stores within the same clusters have items with the same prices (step 112). Setting the product and price combinations by cluster is an example of providing cluster based combinations (step 1016). Preferably, the new prices may be obtained by performing a new optimization, where prices are calculated by cluster instead of by store. Such an optimization might be weighted by volume of sales for each store. The steps of FIG. 1 stop at step 116. Table 4 is an example of such an optimization by cluster.

TABLE 4

| STORE | ITEM | |
|---|---|---|
| | ITEM X | ITEM Y |
| STORE 1 | $6.00 | $9.60 |
| STORE 2 | $6.00 | $9.60 |
| STORE 3 | $8.50 | $6.50 |
| STORE 4 | $8.50 | $6.50 |

The prices for the items in store 1 are the same as the prices for store 2, since they are in the same cluster. Similarly, the prices for the items in store 3 are the same as the prices for store 4, since they are in the same cluster. In this example, the prices for the cluster are close to and in between the prices for the individual stores in the cluster derived when the optimization was done on a store-by-store basis. By providing clusters so the prices for each cluster are as close as possible to the prices for an optimization done on a store-by-store basis, the optimization by cluster is kept as close to the optimization on a store-by-store basis, which minimizes the loss of optimization opportunity.

Over time, as more sales data is collected, the new data may be added to iteratively change the clusters over time. Such iteration may limit the number of stores that can change clusters or may have a similar constraint.

In an embodiment of the invention, each store may have a plurality of product categories. Clustering may be according to product categories, so that a store may be in one cluster for one product category and in another cluster for another product category. This clustering may allow more constraints. For example, a product category with perishable items may have a constraint so that stores within a cluster are relatively close together, while a product category with non-perishable items may not have such a constraint.

Figure 6:
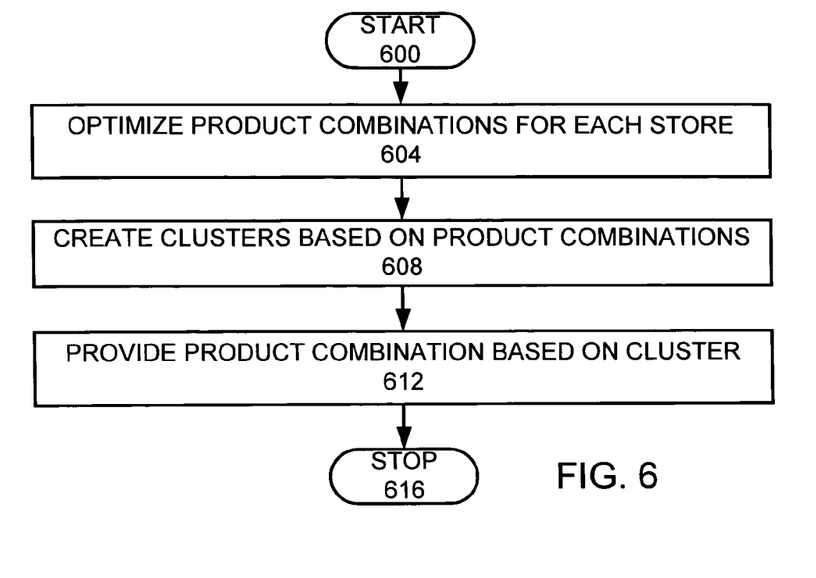
FIG. 6 is a flow chart of another embodiment of the invention.

In another embodiment of the invention, it may be found that for some product categories there may be more products available than what may be offered in each store. For example, there may be more than 500 different soap products, although the stores may only have room to sale 200 products. An optimization engine as described above may be used to determine the most profitable combination of products for each store. A chain of 100 stores may have a hundred product combinations. It may be desirable to provide five clusters of product combinations. This embodiment of the invention would provide clusters of stores according to product combinations (assortment zones) for an entire store or a product category. FIG. 6 is a flow chart on a broader embodiment of the invention. The steps of FIG. 6 start at step 600 as shown. Store specific point-of-sales or survey data may be collected. Using the above example of soap products, an optimization may be performed using the store specific data to determine a combination of 200 products of the 500 soap products that would optimize sales on a store by store basis for each of the 100 stores (step 604). The stores are then clustered into five clusters so that each cluster that a store is placed has the most similar combination of products (step 608). Stores are then provided an assortment of products (product combinations) according to the cluster that the store is in (step 612). The steps of FIG. 6 stop at step 616. As mentioned before, such clustering would have lower sales and/or profit than providing individual product combinations for each individual store, but would be designed to maximize sales and/or revenue for different combinations of five clusters. In one embodiment, the prices are set or optimized on a store by store basis. In another embodiment, an optimization may be done where stores in the same assortment zone form price clusters. Stores may be placed in an assortment cluster so that all stores in the same assortment cluster receive the same assortment and also in a price cluster so that all stores in the same price cluster have the same prices.

Figure 9:
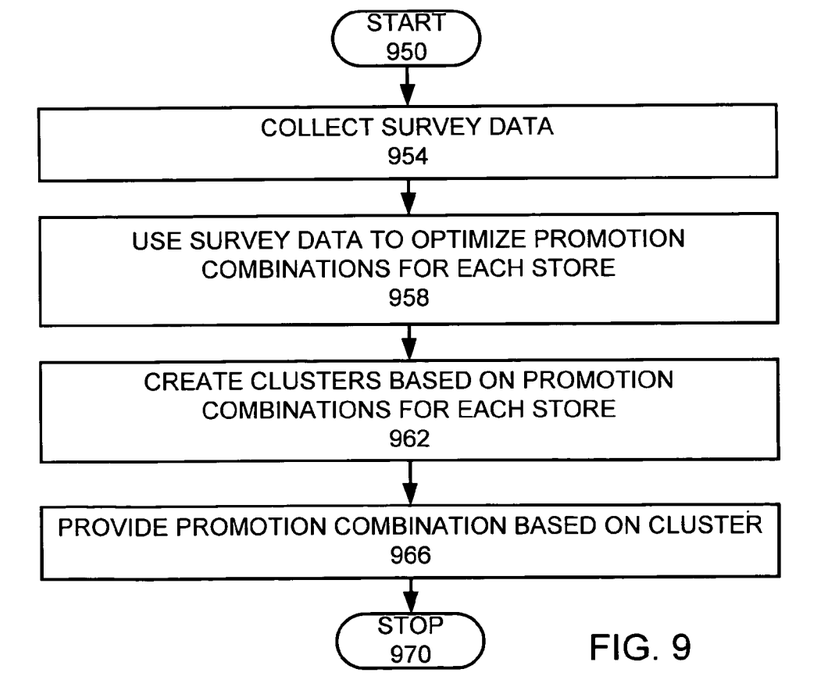
FIG. 9 is a flow chart of another embodiment of the invention.

FIG. 9 is a flow chart of another embodiment of the invention. The steps of FIG. 9 start at step 950 as shown. In this example store specific information may be collected by a survey (step 954). The survey data is used to provide a store by store promotion combination optimization (step 958). In one example, 200 products may be discussed in the survey. A promotion combination may be a combination of 20 of the 200 products at different discounts and displays. It may be found that each store of 100 stores in a chain has a different promotion combination optimization. Promotion clusters are created to cluster the stores according to how close their promotion combinations are (step 962). Promotion combinations for each store are then determined by the cluster that the store is in (step 966). The steps of FIG. 9 stop at step 970.

Other embodiments may be generated according to margins or by metric or according to direction of movement.

Figure 7A:
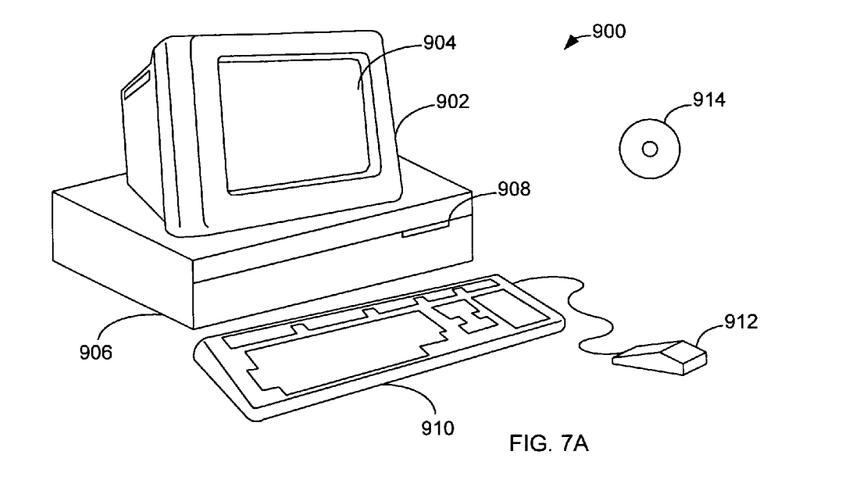
FIGS. 7A and 7B illustrate a computer system, which forms part of a network and is suitable for implementing embodiments of the present invention.
Figure 7B:
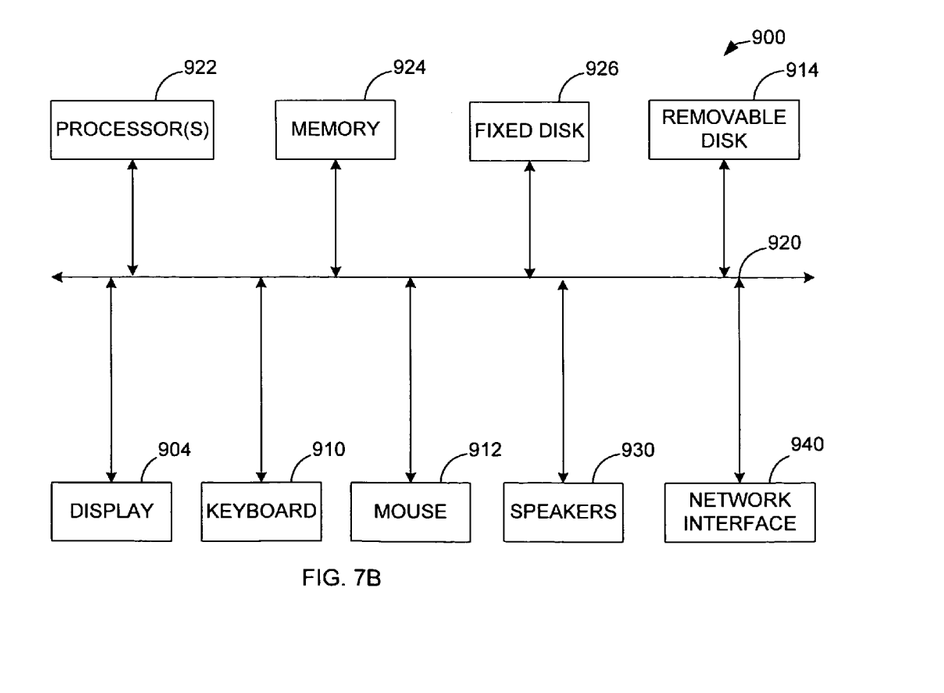

FIGS. 7A and 7B illustrate a computer system 900, which is suitable for implementing embodiments of the present invention. FIG. 7A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Figure 8:
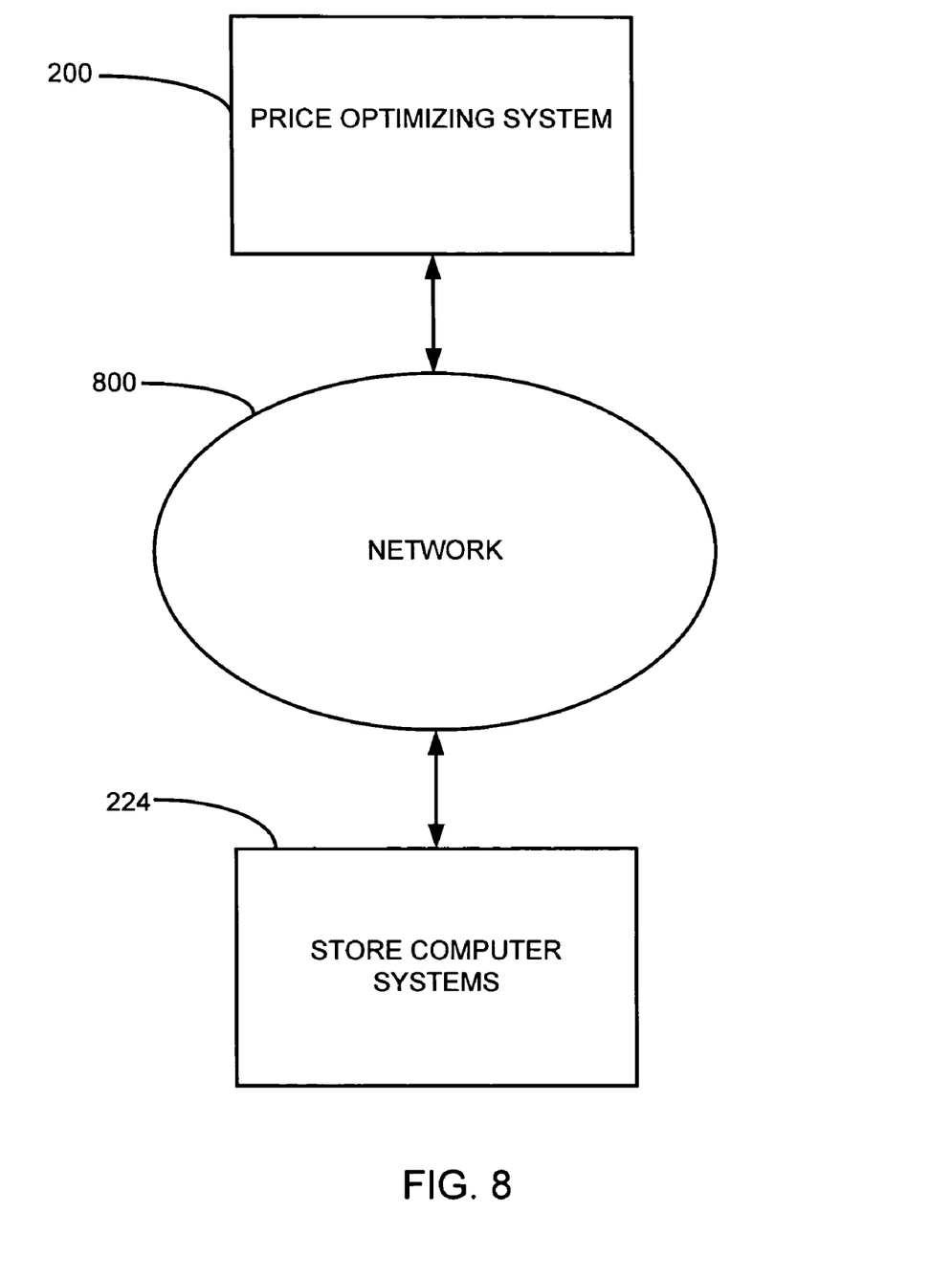
FIG. 8 is a schematic illustration of an embodiment of the invention that functions over a network.

FIG. 8 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment, the price optimizing system 200 is connected to the network 800. Computer systems used by the stores 224 are also connected to the network 800. The computer systems for the stores 224 are able to bi-directionally communicate with the price optimizing system 200 over the network 800.

Computer readable media may be used by the computer system 900 to communicate over the network 800 to collect store specific information to generate a consumer response model, and use the consumer response model to create clusters. Computer readable media may be used by the computer system 900 to perform an optimization to obtain individual store prices, which are used to create clusters and then to perform an optimization for the plurality of clusters to obtain cluster prices.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer-implemented method for forming a plurality of stores into a plurality of store clusters based on price optimization, and re-optimizing prices based on the plurality of store clusters, comprising:

collecting store specific information from a plurality of stores;

optimizing prices for a plurality of products for each individual store of the plurality of stores, and wherein the price optimization uses demand coefficients, cost coefficients and optimization rules;

creating a plurality of store clusters from the plurality of stores based on the closeness of the optimized prices of the plurality of products for each individual store, based on store specific information, and based on demand group structure of the plurality of products, and wherein the demand group structure of the plurality of products is based on substitutable products;

re-optimizing prices for the plurality of products for at least one of the plurality of store clusters, wherein the re-optimizing of prices uses demand coefficients, cost coefficients and optimization rules, and wherein the re-optimizing of prices is implemented on a computer; and providing the re-optimized prices to the at least one of the plurality of store clusters; and wherein the closeness of the optimized prices of the plurality of products is computed using a distance equation:

$$\text{Distance} = \sqrt{(\text{Price}_{s1,x} - \text{Price}_{s2,x})^2 + (\text{Price}_{s1,y} - \text{Price}_{s2,y})^2}$$

wherein s1 and s2 are stores in the at least one of the plurality of store clusters, and wherein x and y are two of the optimized prices.

2. The method, as recited in claim 1, further comprising providing cluster based combinations.

3. The method, as recited in claim 2, wherein the store specific information is selected from a group comprising point-of-sales data, customer survey data, and cost data.

4. The method, as recited in claim 3, wherein the combinations further include assortment and promotion combinations.

5. The method, as recited in claim 1, wherein the creating the plurality of clusters, comprises:
provided at least one constraint; and
placing stores that meet the constraints and with the closest optimal combinations in the same cluster of the plurality of store clusters.

6. The method, as recited in claim 5, wherein the at least one constraint places two stores in the same cluster, by making each store of the two stores have the same optimal combination.

7. The method, as recited in claim 5, wherein the at least one constraint specifies a maximum number of clusters.

8. A computer-readable medium having computer-readable instructions embedded therein, which, when executed by a computer, causing said computer to implement a method for forming a plurality of stores into a plurality of store clusters based on price optimization, and re-optimizing prices based on the plurality of store clusters, comprising:
collecting store specific information from a plurality of stores;
optimizing prices for a plurality of products for each individual store of the plurality of stores, and wherein the price optimization uses demand coefficients, cost coefficients and optimization rules;
creating a plurality of store clusters from the plurality of stores based on the closeness of optimized prices of the plurality of products for each individual store, based on store specific information, and based on demand group structure of the plurality of products, and wherein the demand group structure of the plurality of products is based on substitutable products;
re-optimizing prices for the plurality of products for at least one of the plurality of store clusters, and wherein the re-optimizing of prices uses demand coefficients, cost coefficients and optimization rules;
providing the re-optimized prices to the at least one of the plurality of store clusters; and
wherein the closeness of the optimized prices of the plurality of products is computed using a distance equation:

$$Distance = \sqrt{(Price_{s1,x} - Price_{s2,x})^2 + (Price_{s1,y} - Price_{s2,y})^2}$$

wherein s1 and s2 are stores in the at least one of the plurality of store clusters, and wherein x and y are two of the optimized prices.

9. The computer-readable medium, as recited in claim 8, further comprising computer-readable instructions for causing said computer to provide cluster based combinations.

10. The computer-readable medium, as recited in claim 9, wherein the store specific information is selected from a group comprising point-of-sales data, customer survey data, and cost data.

11. The computer-readable medium, as recited in claim 10, wherein the combinations further include assortment and promotion combinations.

12. The computer-readable medium, as recited in claim 8, wherein creating the plurality of clusters, comprises:
providing at least one constraint; and
placing stores that meet the constraints and with the closest optimal combinations in the same cluster of the plurality of store clusters.

13. The computer-readable medium, as recited in claim 12, wherein the at least one constraint places two stores in the same cluster, by making each store of the two stores have the same optimal combination.

14. The computer-readable medium, as recited in claim 12, wherein the at least one constraint specifies a maximum number of clusters.

15. The method, as recited in claim 1, further comprising providing at least one constraint and wherein the at least one constraint prohibits two stores of the plurality of stores from being in the same cluster.

16. The method, as recited in claim 5, wherein the at least one constraint places two stores in the same cluster, by averaging the prices of an item and placing the average price as the price of the item in each store.

17. The method, as recited in claim 5, wherein the at least one constraint places stores with a geographical closeness in the same cluster.

18. The computer-readable medium as recited in claim 8, further comprises computer-readable instructions for causing said computer to provide at least one constraint and wherein the at least one constraint prohibits two stores of the plurality of stores from being in the same cluster.

19. The computer-readable medium as recited in claim 12, wherein the at least one constraint places two stores in the same cluster, by averaging the prices of an item and placing the average price as the price of the item in each store.

20. The computer-readable medium as recited in claim 12, wherein the at least one constraint places stores with a geographical closeness in the same cluster.

* * * * *